July 10, 1973  G. A. SOFER ET AL  3,745,069
FUEL ASSEMBLIES CONTAINING $UO_2$ AND $PuO_2$-$UO_2$ FOR
WATER COOLED NUCLEAR REACTORS
Filed Oct. 30, 1969

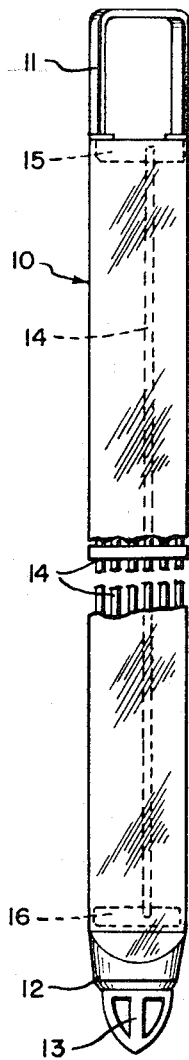
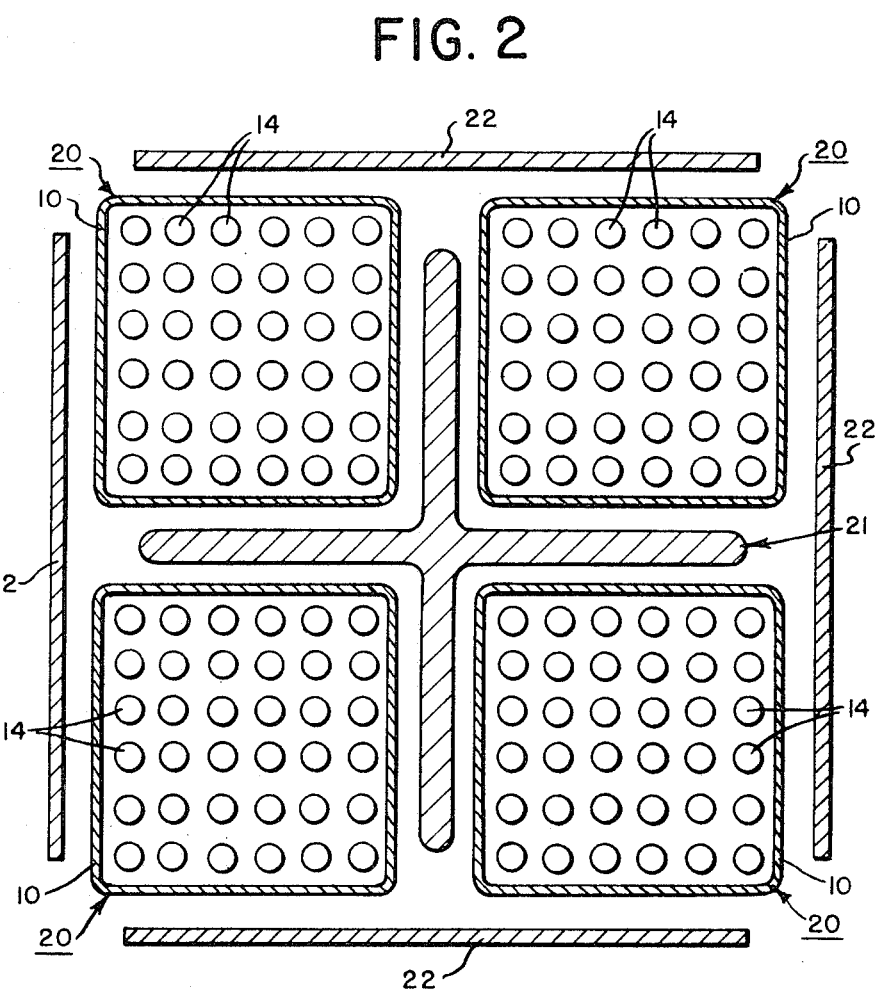

Number of Fuel Elements — 368
Number of Control Rods — 89
Number of Poison Curtains
(in initial loading only) — 156

INVENTORS
GEORGE A. SOFER
JAMES S. TULENKO
JAMES R. TOMONTO

BY
ATTORNEYS

FIG. 6
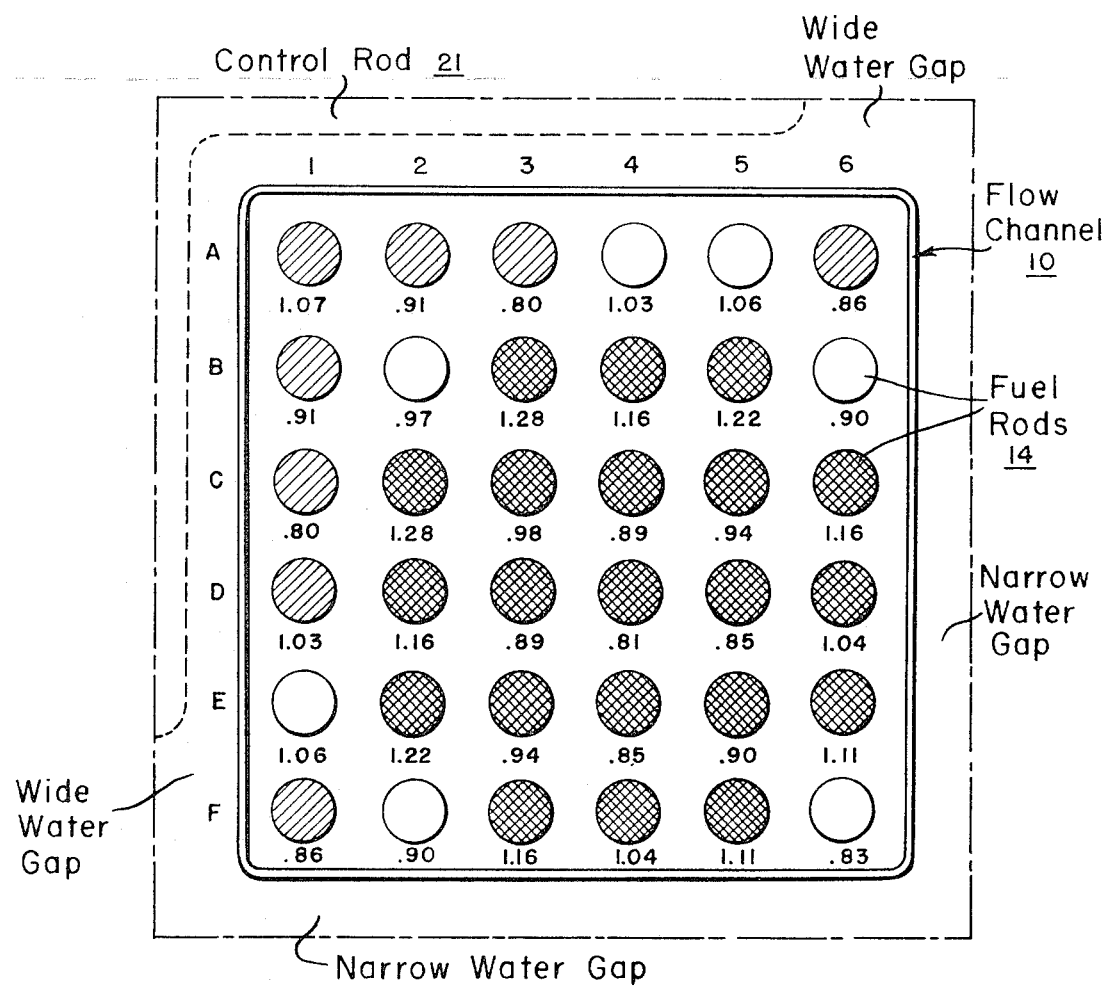
 1.9 % U²³⁵ in UO₂
 2.7 % U²³⁵ in UO₂
 2.0 % PuO₂ (fissionable) + UO₂ (natural)

3,745,069
FUEL ASSEMBLIES CONTAINING UO₂ AND
Pu0₂-UO₂ FOR WATER COOLED NUCLEAR
REACTORS
George A. Sofer, White Plains, James S. Tulenko, Bedford Village, and James R. Tomonto, Hawthorne, N.Y., assignors to United Nuclear Corporation, Elmsford, N.Y.
Filed Oct. 30, 1969, Ser. No. 872,586
Int. Cl. G21c 3/34
U.S. Cl. 176—78                    7 Claims

ABSTRACT OF THE DISCLOSURE

A water cooled nuclear reactor typically includes a core comprising a plurality of rod-type nuclear fuel assemblies separated by water gaps. A fuel assembly for utilizing plutonium-bearing fuel rods comprises a plurality of fuel rods containing uranium oxide for occupying the regions near the large water gaps between adjacent assemblies and one or more fuel rods containing a mixture of plutonium oxide and uranium oxide disposed in the interior of the assembly. Preferably the plutonium oxide is deployed in the minimum number of rods consistent with the power peaking requirements of the reactor.

BACKGROUND OF THE INVENTION

This invention relates to fuel assemblies containing $UO_2$ and $Pu_2-UO_2$ fuel rods for use in water cooled nuclear reactors such as boiling water reactors (BWR's) and pressurized water reactors (PWR's).

Nuclear reactors are the principal means for converting the large amounts of energy released by nuclear fission into useful thermal energy. When a fissionable atom such as $U^{233}$, $U^{235}$, $Pu^{239}$ or $Pu^{241}$ absorbs a thermal neutron, there is a high probability that it will undergo nuclear fission splitting into two fission products of lower atomic weight having great kinetic energy and emitting a number of neutrons. In a nuclear reactor the kinetic energy of the fission products is dissipated as heat in the nuclear fuel elements and removed from the reactor by a coolant in heat exchange relationship with the fuel elements. The fission neutrons are slowed down to the thermal range by a moderator and, in turn, used to induce a subsequent fission in another atom in order to keep the reaction self-sustaining. Excess neutrons can be used to produce additional fissionable material such as $Pu^{239}$ or $Pu^{241}$ form a fertile material such as $U^{238}$.

Water cooled nuclear reactors possess a number of advantages which make them especially attractive for use in power generation. In these reactors water performs the dual function of cooling the reactor core and moderating fission neutrons. Water cooled reactors of many types are described in the literature of the art. (See for example J. K. Pickard, ed., Nuclear Power Reactors, Van Nostrand, 1957.) A typical heterogeneous BWR or PWR comprises in essence, a reactor pressure vessel and a nuclear chain reacting core made up of a plurality of nuclear fuel element assemblies. Each fuel assembly comprises an openended tubular flow channel surrounding a bundle of rodtype nuclear fuel elements—each of which is typically zirconium-clad enriched uranium oxide. Water is circulated through the channels and around the fuel rods both to remove heat and to act as a moderator.

One of the problems facing the user of water cooled reactors is the question of what to do with the plutonium produced from fertile materials in the fuel elements. The plutonum is a valuable source of fissionable material. (A typical BWR regenerates an amount of fissionable plutonium equal to about 20 percent of the initial fissile inventory; a PWR regenerates even more.) However, specially built fast breeder reactors capable of readily using plutonium are not expected to go into operation in significant numbers until about 1990. Meanwhile, the cost of storing plutonum is estimated to be on the order of 12 percent of its value per year. Therefore, it would appear highly desirable to use the plutonium in presently operating reactors.

Because the fission characteristics of plutonium differ considerably from those of uranium, a number of potentially serious problems are associated with its use in water cooled reactors. First, because the fission cross-section of fissionable plutonium is considerably greater than that of $U^{235}$, the use of plutonium can both increase the possibility of excessive power peaking—particularly near water gaps—and also reduce the effectiveness of control rods. As is well known in the art, excessive power peaking of even a single fuel element—particularly in a water cooled reactor—can limit the power level of an entire reactor core, and a reduction in the effectiveness of control rods can lead to the requirement of an increased number of control rods to maintain prescribed license shutdown margins. Second, the high alpha activity of plutonium requires special handling of plutonium-bearing fuel rods over standard uranium rods. Third, the fraction of prompt neutrons emitted by fission of $Pu^{239}$ is considerably greater than the fraction emitted by fission of $U^{235}$. This higher proportion of prompt neutrons can decrease the safety factor of the reactor because less excess reactivity is required to achieve a neutron multiplication factor in excess of unity from prompt neutrons alone. In addition, where the plutonium is to be recycled in the reactor in which it was generated, the plutonium containing fuel assembly must be compatible with uranium oxide fuel assemblies in power performance and operating behavior.

SUMMARY OF THE INVENTION

In accordance with the present invention, plutonium is distributed in a fuel assembly for a water cooled nuclear reactor in such a manner as to avoid excessive power peaking, to maintain reasonable control rod effectiveness and to minimize fabrication cost. In particular, the fuel assembly comprises two types of fuel rods: rods containing uranium oxide for occupying the regions near large water gaps (and thus subject to a relatively high thermal neutron flux), and rods containing a mixture of plutonium oxide and uranium oxide disposed in the interior portions of the assembly away from the large water gaps. Preferably the plutonium is deployed in the minimum number of rods consistent with the power peaking requirements of the reactor.

BRIEF DESCRIPTION OF THE DRAWINGS

The advantages, nature and various additional features of the present invention will appear more fully upon consideration of the illustrative embodiments now to be described in detail in connection with the accompanying drawings in which:

FIG. 1 is a foreshortened longitudinal view in partial cross section of a typical rod-type nuclear fuel assembly;

FIG. 2 is a cross section of a typical cluster of fuel assemblies disposed within the core of a water cooled nuclear reactor;

FIG. 6 is a transverse cross section of a second embodiment of a fuel assembly in accordance with the invention.

DETAILED DESCRIPTION

Figure 3:
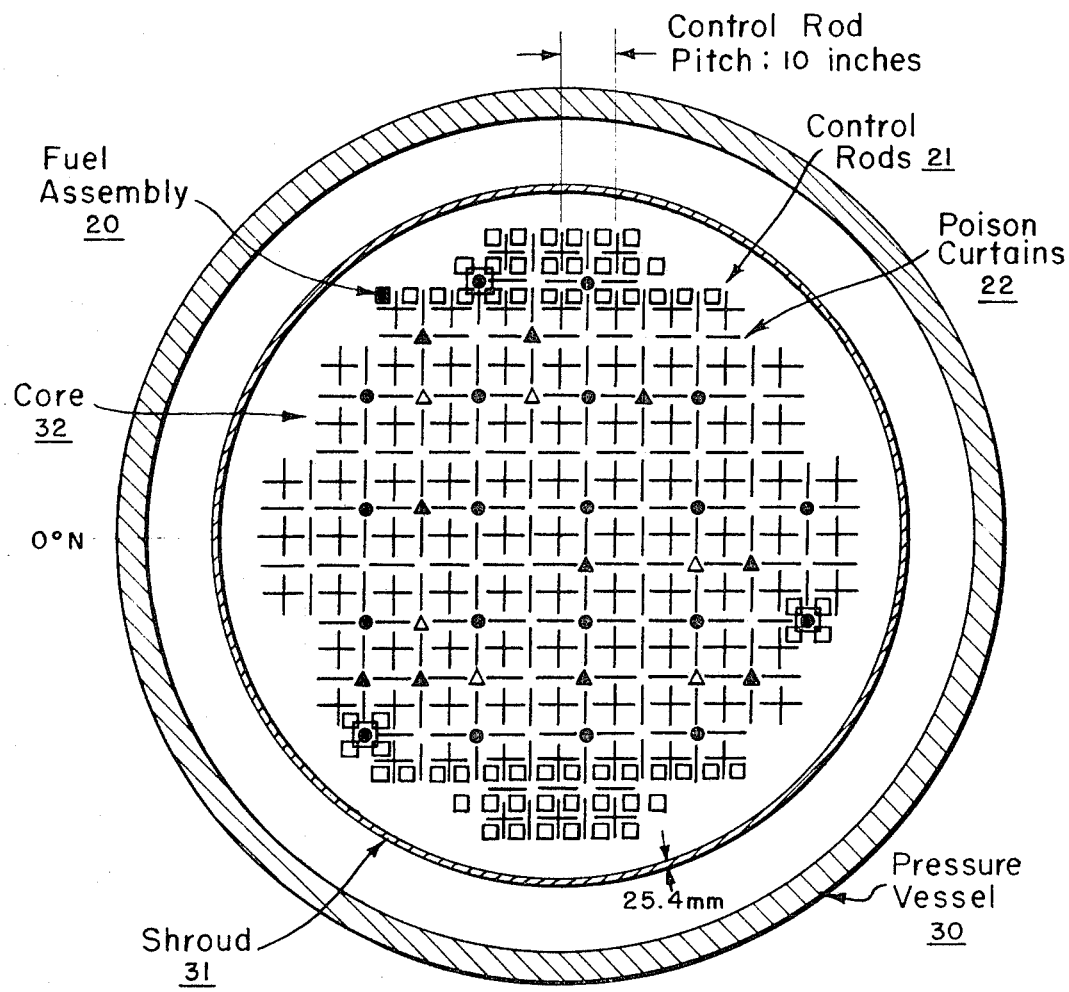
FIG. 3 is a schematic transverse cross section of a water cooled nuclear reactor typical of the reactor in which fuel assemblies in accordance with the invention can be used.

Referring to the drawings, FIG. 1 is a foreshortened longitudinal view in partial cross section of a typical fuel element assembly comprising a flow channel (or shroud) 10 of square transverse cross section provided with a lifting bail 11 at its upper end and a support piece 12 at its lower end. Support piece 12 is provided with coolant flow openings 13 and the upper end of the flow channel channel is open to permit coolant flow through the channel. Contained within the flow channel is a square array of rod-type fuel elements 14 extending between upper and lower tie plates 15 and 16, respectively. For simplicity of illustration, only a single rod 14 is shown extending the full length of the fuel assembly between the tie plates, although all the fuel elements are so disposed. Intermediate fuel element spacing devices 17 are disposed along the length of the fuel assembly within the channel 10 to maintain the fixed spacing of the fuel elements throughout their entire length.

FIG. 2 is a transverse cross section of a typical cluster of fuel assemblies disposed within the core of a water cooled nuclear reactor. The cluster comprises four fuel assemblies 20 such as described in FIG. 1. Each assembly comprises a channel 10 and a 6 x 6 array of fuel rods 14. Disposed between the four assemblies is a cruciform shaped control rod 21 of a neutron absorbing material such as, for example, a $B_4C$ filled stainless steel tube. When the reactor is shut down, the control rod is in position between adjacent assemblies. When the reactor is operating, the control rod is withdrawn. Disposed adjacent to those surfaces of the fuel assemblies which are not adjacent to the control rods are four curtains 22 of a poison material, such as boron-stainless steel plates, for providing additional control during the initial operating period.

It should be noted that due to the wide space required for the control rod 21, two intersecting surfaces of each assembly in this cluster will be adjacent to wide water gaps when the control rod is withdrawn. While this could be avoided by providing each control rod with an inert follower to prevent the inflow of water, the follower would double the height of the reactor structure. As a consequence of these wide water gaps—and, to a lesser extent the smaller water gaps adjacent to the remaining fuel assembly surfaces—the assembly is subjected to a spacially non-uniform thermal neutron flux.

FIG. 3 is a schematic transverse cross section of a water cooled nuclear reactor typical of the reactors in which fuel assemblies in accordance with the invention can be used. The reactor comprises, in essence, a pressure vessel 30, a shroud 31 and a core 32. The core comprises a plurality of fuel assembiles 20 typically disposed in clusters around cruciform shaped control rods 21. Poison curtains 22 are initially disposed around the periphery of the cluster to produce a plurality of structures similar to that shown in FIG. 2.

A specific example of a reactor having this structure is the KRB Gundremingen power station boiling water nuclear reactor described in detail in the literature of the art. This reactor has a core for containing 368 fuel assemblies, 89 control rods and 156 poison curtains. Each fuel assembly contains a 6 x 6 array of fuel rods disposed within a 4.47 inch square zirconium channel having a thickness of about 0.060 inch. The fuel is contained in zirconium alloy (Zircaloy-2) tubes, each having an outside diameter of 0.563 inch, a wall thickness of 0.035 inch and an active length of 130 inches. The reactor was designed to utilize $UO_2$ fuel having an average fissile content of 2.7 percent by weight. The fuel is disposed in the rods as sintered pellets at 94 percent of theoretical density.

The control rods are stainless steel tubes (0.025 inch wall thickness) containing $B_4C$. They have a span of 7.1 inches, a thickness of 0.276 inch and are placed on a 10 inch square pitch. The poison curtains are full length stainless steel (130" x 6" x 0.063") plates axially zoned with 3700, 5700 and 3700 parts per million of natural boron, respectively.

In operation, the control rods and poison curtains are withdrawn, leaving the fuel assemblies in a critical mass relationship. The core is designed to produce 237 Mw(e) (net), 801 Mw(t). It is operated at a pressure of 1015 pounds per square inch and with a coolant inlet temperature of 510° F. At full power the average coolant void content within the fuel assemblies is 28.9 percent by volume.

Figure 4:
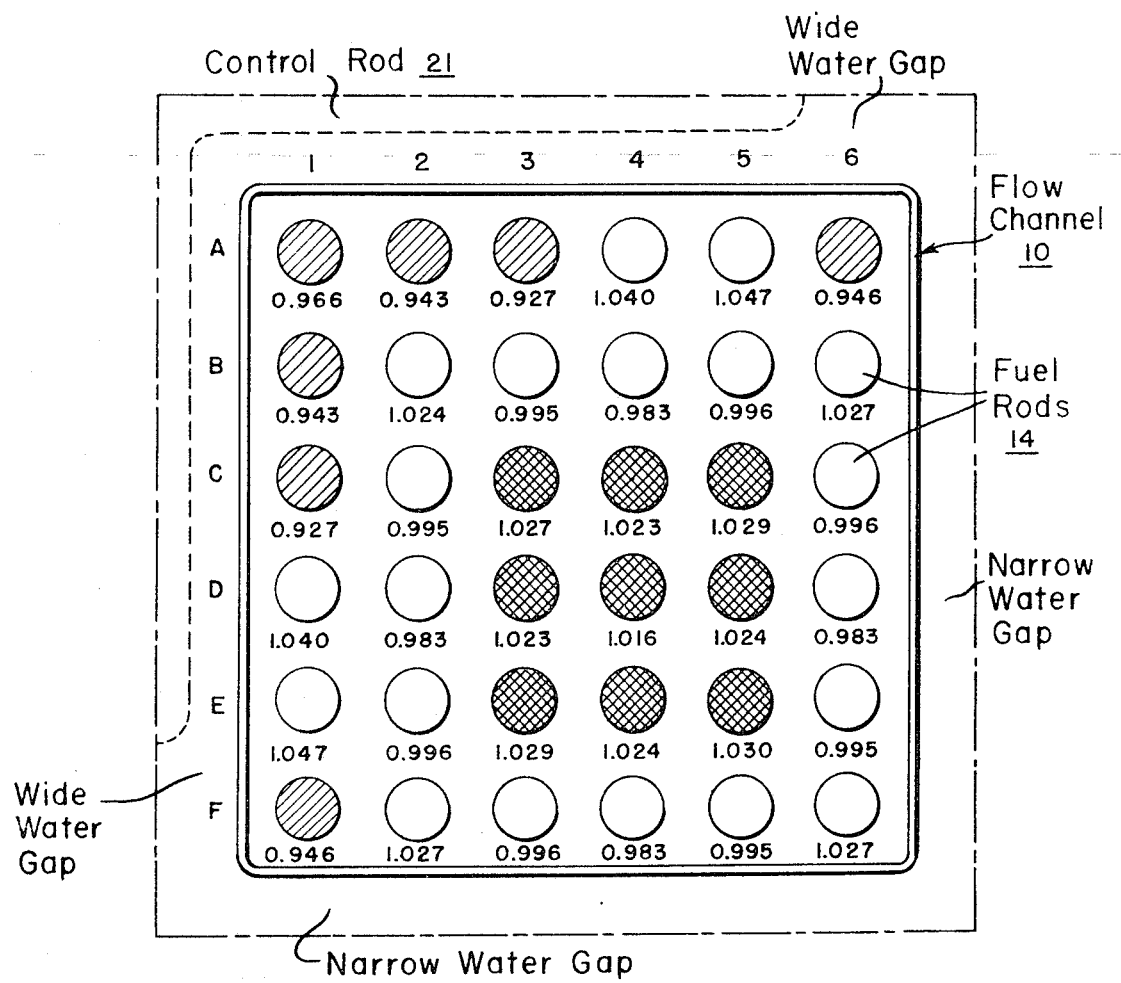
FIG. 4 is a transverse cross section of a first embodiment of a fuel assembly in accordance with the invention.

FIG. 4 is a transverse cross section of a fuel assembly in accordance with the invention for use in a water cooled nuclear reactor. The assembly comprises a 6 x 6 array of rod type fuel elements 14 disposed in flow channel 10. The nuclear fuel in the rods is of three different compositions: a mixture of plutonium oxide and natural uranium oxide, high enrichment uranium oxide and low enrichment uranium oxide. The low enrichment uranium oxide rods (containing 1.927 percent $U^{235}$ by weight) are disposed in the regions of greatest thermal neutron flux near the wide water gaps and in the corner positions. The more highly enriched uranium oxide rods (containing 2.7 percent $U^{235}$ by weight) are disposed in the remaining regions of the assembly of intermediate flux surrounding the center of the assembly. The nine plutonium oxide-uranium oxide rods are placed in a 3 x 3 array in the center of the assembly where they are subject to a relatively low flux. These rods contain 1.99 percent of fissile plutonium atoms. Advantageously, these rods are fabricated from plutonium having the isotopic composition produced in a previously discharged uranium oxide fuel assembly, and the plutonium oxide is mixed with unenriched (natural) uranium oxide to reduce fabrication costs.

This particular fuel assembly is designed for use in recycling plutonium in the KRB reactor. The amount of fissionable plutonium in the assembly (0.51 percent by weight) corresponds to the plutonium content of a uranium oxide fuel assembly discharged from the reactor after a 22,000 Mwd/MTU exposure. (The isotopic composition of such an exposure is: $Pu^{239}$—63 atom percent, $Pu^{240}$—21 percent, $Pu^{241}$—12 percent and $Pu^{242}$—4 percent.) The total fissile atom content is 2.7 percent by weight—the same as in the uranium oxide assemblies.

That excessive power peaking is avoided by this distribution of fuel elements can be seen by reference to FIG. 4 where the relative power level of each fuel rod in the assembly is shown immediately below the rod. This relative power level is the ratio of the average level over the length of the rod to the average level for all rods in the assembly. These relative power levels are equivalent to those for an all-uranium assembly. The $UO_2$ rods disposed in the peripheral positions are capable of generating amounts of power comparable with the

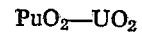

rods despite the higher plutonium fission cross section. Thus, a relatively flat power distribution can be achieved with two sets of fuel elements having essentially the same infinite multiplication factor, $K_{00}$, at the end of life burn up.

The safety factor is not significantly reduced by using plutonium rods in this type of distribution. Reduction of control rod effectiveness is greatly minimized by placing the plutonium in the central portions of the array. Moreover, a lower prompt neutron fraction is achieved by using both $UO_2$ and $PuO_2$—$UO_2$ rods than would be obtained by distributing the same amount of $PuO_2$ uniformly among all the rods.

In addition, this distribution is economically advantageous. A lower fabrication cost is achieved by not mixing the plutonum in all rods. In addition, since the $PuO_2$ is restricted to a limited number of fuel rods, the more valuable plutonium produced in fresh $UO_2$ is separated from plutonium which has been recycled one or more times. Since recycled plutonium is less reactive by virtue of recycled $Pu^{242}$, additional power flattening can be obtained in fuel assemblies utilizing plutonium by placing fresh plutonium in the regions of lowest thermal neutron flux and recycled plutonium in position of slightly greater flux. In addition, selective shielding can be used in the fabrication process: low shielding for freshly-bred plutonium and high shielding for recycled plutonium.

Figure 5:
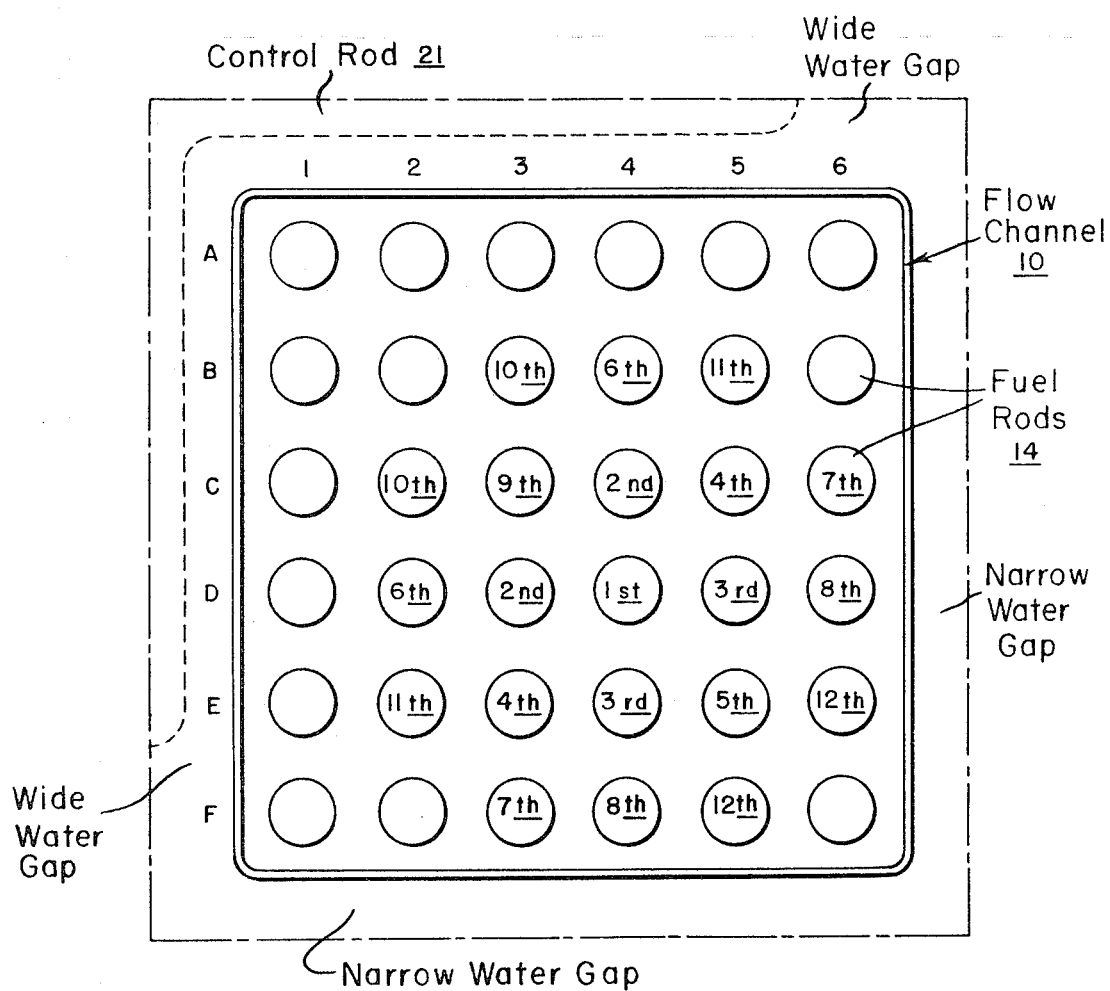
FIG. 5 is a transverse cross section of a rod-type nuclear assembly showing the priority of preferred positions for loading plutonium-bearing fuel elements.

FIG. 5 is a transverse cross section of a rod-type nuclear assembly showing the priority of preferred positions for loading plutonium-bearing fuel elements. Each fuel rod position can be designated by an alpha-numeric coordinate system having its center at position nearest the corner nearest the intersection of the two wide water gaps. Thus the fuel rod position in the upper left hand corner of FIG. 5 is (A,1), and the position in the lower right hand corner is (F,6). The priority rating for each of the twenty-one positions having the highest priority for the placement of plutonium-bearing rods is indicated within the circle representing the rod position. Thus if only one plutonium-bearing rod is to be used, it is placed in the 1st priority position at (D,4). If three plutonium-bearing rods are to be used, they are placed at the 1st position and each of the two 2nd positions at (D,3) and (C,4), and so on. The 1st position is the position in the assembly subjected to the lowest flux of thermal neutrons, and as the priority number increases, the thermal neutron flux is greater.

Advantageously, the plutonium is deployed in the minimum number of rods consistent with the power peaking requirements of the reactor and distributed in the lowest priority number positions in the assembly. The remaining positions are filled with uranium oxide rods. When the reactor is used to recycle its own plutonium, the plutonium is preferably distributed among 25 to 50 percent of the fuel elements, and the enrichment of the uranium oxide fuel rods is chosen to achieve a total fissile atom content comparable to that of uranium oxide fuel assemblies used in the reactor.

FIG. 6 shows a cross section of a fuel assembly having a relatively high plutonium content. This type of fuel assembly can be used when plutonium is available for recycle from several reactors, or when the plutonium bred in one reactor is recycled in a fraction of the total number of reload assemblies. As in the embodiment of FIG. 4, three separate fuel rod compositions are used. In the regions of highest thermal flux, low enrichment $UO_2$ rods having 1.9 percent of $U^{235}$ atoms are used, and in the regions of low flux, the rods have about 2.0 percent of fissile plutonium atoms in a mixture of plutonium oxide and natural uranium oxide. The relative power levels of the fuel rods are shown below the rods. This assembly, like that described in connection with FIG. 4, is designed to be compatible with uranium assemblies.

Figure 7:
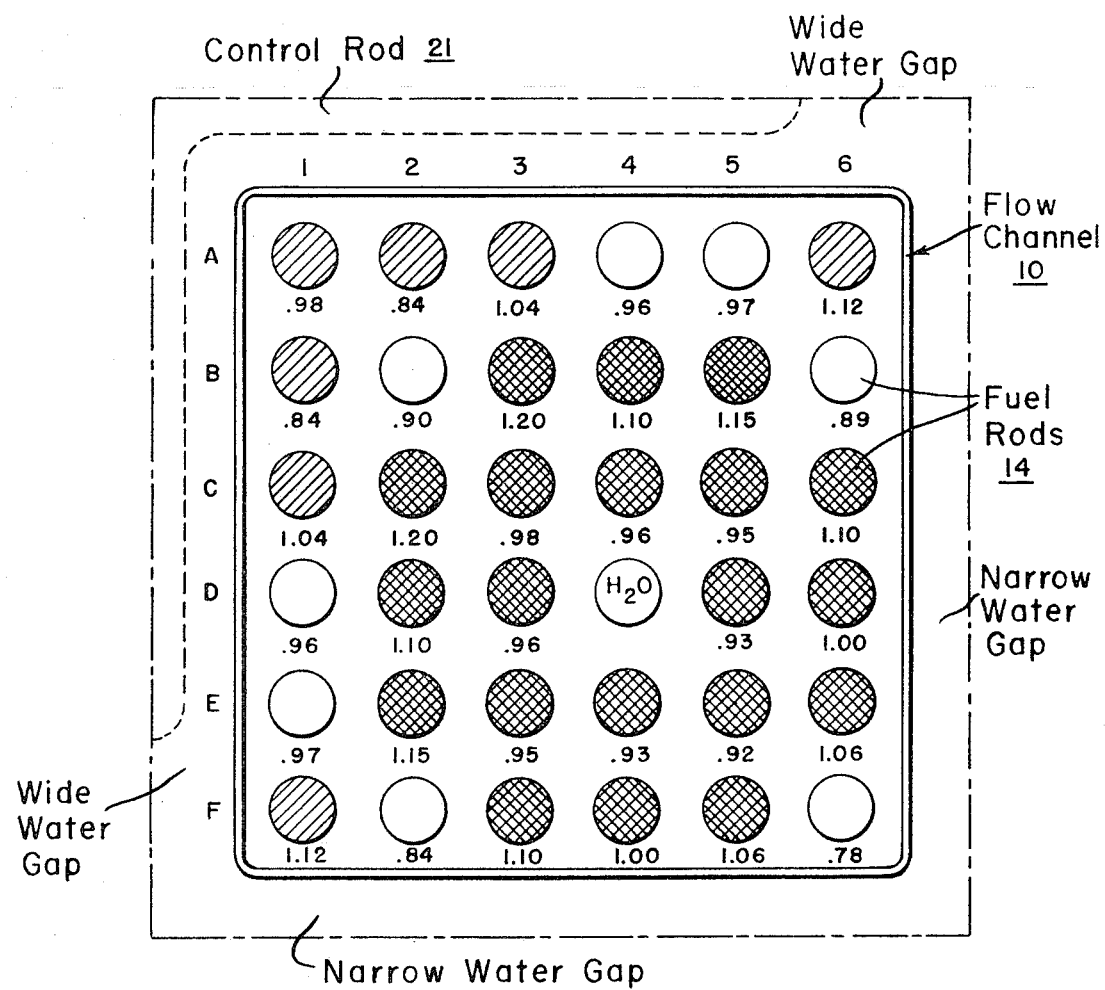
FIG. 7 is a transverse cross section of a fuel assembly in accordance with a second aspect of the invention.

The fuel assembly illustrated in FIG. 7 is substantially similar to that shown in FIG. 6 except that the fuel rod in the position of first priority has been replaced by a water-filled rod to moderate fast neutrons in the central portion of the assembly. Where plutonium-bearing rods surround other plutonium-bearing rods, the large absorption cross section of the outer plutonium-bearing rods greatly reduces the thermal neutron flux in the internal positions. As a consequence the power production in these regions may be considerably lower than the average for the whole assembly despite the presence of plutonium. Therefore, in such cases, it is found advantageous to replaced an internal fuel rod, preferably the rod in the first priority position, with a water-filled rod. This extra water increases the relative power production in the nearby high priority positions by thermalizing epithermal neutrons passing through the region. The achievement of a more uniform relative power distribution by this structure can be seen by comprising the relative power levels in the central portion of the assembly of FIG. 6 with those in the corresponding positions in FIG. 5. In addition, the water filled rod reduces the capture-to-fission ratio in the plutonium isotopes by reducing the number of epithermal neutrons, reduces the fuel inventory requirements, and provides a convenient space for fuel assembly instruments and material to be irradiated for isotope production.

We claim:

1. A fuel assembly for use in a water cooled nuclear reactor comprising:
   an elongated tubular flow channel;
   a plurality of elongated fuel rods disposed within said flow channel in a parallel array;
   at least one but less than all of said rods containing a mixture of plutonium oxide and uranium oxide and being disposed predominantly in the interior portion of said array; and
   the remainder of said fuel rods containing uranium oxide and being disposed predominantly in the peripheral portions of said array.

2. A fuel assembly according to claim 1 wherein said uranium oxide mixed with said plutonium oxide is unenriched uranium oxide.

3. A fuel assembly according to claim 1 wherein said plutonium oxide is deployed in the minimum number of rods consistent with the power peaking requirements of the reactor.

4. A fuel assembly according to claim 1 wherein a plurality of fuel rods containing a mixture of plutonium oxide and uranium oxide are deployed in a group and a water-filled rod for moderating epithermal neutrons is disposed in the center region of said group.

5. A fuel assembly for use in a water cooled nuclear reactor designed primarily for uranium oxide fuel assemblies and providing water gaps adjacent to the fuel assemblies comprising:
   an elongated tubular flow channel;
   a plurality of elongated fuel rods disposed within said flow channel in a parallel array, at least one but less than all of said fuel rods containing a mixture of plutonium oxide having the isotopic composition of plutonium produced in a previously discharged uranium oxide fuel assembly and unenriched uranium oxide, and the remainder of said fuel rods containing uranium oxide having a total enrichment sufficient to give the fuel assembly a fissile atom content comparable to uranium oxide replacement assemblies adapted for use in said reactor;
   wherein the plutonium-bearing fuel rods are disposed predominantly in the interior portions of said assembly.

6. A fuel assembly according to claim 5 wherein said oxide of plutonium is deployed in between 25 and 50 percent of said rods, inclusive.

7. A fuel assembly for use in a water cooled nuclear reactor comprising:
   a plurality of elongated fuel rods disposed in a parallel array;
   upper and lower tie plates disposed at opposite ends of said array for maintaining the rods therebetween;

one or more intermediate fuel element spacing devices for maintaining the spacing between the rods of said array throughout the length of the array;

at least one but less than all of said fuel rods containing a mixture of plutonium oxide and uranium oxide and being disposed predominantly in the interior portion of said array; and the remainder of said fuel rods containing uranium oxide and being disposed predominantly in the peripheral portions of said array.

References Cited

UNITED STATES PATENTS

| | | | |
|---|---|---|---|
| 3,141,827 | 7/1964 | Iskenderian | 176—40 X |
| 3,287,227 | 11/1966 | Ackroyd et al. | 176—40 |
| 3,396,078 | 8/1968 | Visner | 176—40 X |
| 3,287,224 | 11/1966 | Loewenstein | 176—40 X |
| 3,378,457 | 4/1966 | Davidson et al. | 176—40 X |
| 3,042,598 | 7/1962 | Crowther | 176—78 X |
| 3,140,234 | 7/1964 | Loewenstein | 176—17 |
| 3,145,149 | 8/1964 | Imhoff | 176—54 |
| 3,147,191 | 9/1964 | Crowther | 176—78 X |
| 3,211,621 | 10/1965 | Creagan | 176—78 X |
| 3,267,001 | 8/1966 | Greebler | 176—40 X |
| 3,382,153 | 5/1968 | Biggeetol | 176—78 X |
| 3,432,389 | 4/1969 | Stern | 176—40 |
| 3,481,832 | 12/1969 | Rickert | 176—50 |

CARL D. QUARFORTH, Primary Examiner

G. G. SOLYST, Assistant Examiner

U.S. Cl. X.R.

176—76